(12) United States Patent
Pahle

(10) Patent No.: US 9,358,961 B2
(45) Date of Patent: Jun. 7, 2016

(54) DISC BRAKE, IN PARTICULAR FOR A COMMERCIAL VEHICLE, AND BRAKE PAD FOR A DISC BRAKE

(71) Applicant: KNORR-BREMSE Systeme fuer Nutzfahrzeuge GmbH, Munich (DE)

(72) Inventor: Wolfgang Pahle, Bad Wiessee (DE)

(73) Assignee: KNORR-BREMSE System fuer Nutzfahrzeuge GmbH, Munich (DE)

( * ) Notice: Subject to any disclaimer, the term of this patent is extended or adjusted under 35 U.S.C. 154(b) by 7 days.

(21) Appl. No.: 14/228,453

(22) Filed: Mar. 28, 2014

(65) Prior Publication Data

US 2014/0209418 A1  Jul. 31, 2014

Related U.S. Application Data

(63) Continuation of application No. PCT/EP2012/069094, filed on Sep. 27, 2012.

(30) Foreign Application Priority Data

Sep. 28, 2011 (DE) .......................... 10 2011 115 214

(51) Int. Cl.
| | |
|---|---|
| *F16D 65/095* | (2006.01) |
| *B60T 1/06* | (2006.01) |
| *F16D 55/226* | (2006.01) |
| *F16D 65/092* | (2006.01) |

(Continued)

(52) U.S. Cl.
CPC ................. *B60T 1/065* (2013.01); *F16D 55/22* (2013.01); *F16D 55/226* (2013.01); *F16D 65/092* (2013.01); *F16D 2125/587* (2013.01)

(58) Field of Classification Search
CPC .......................... F16D 65/095; F16D 2125/587
USPC ............ 188/73.1, 73.31, 73.37, 73.41, 250 F, 188/250 G, 250 B
See application file for complete search history.

(56) References Cited

U.S. PATENT DOCUMENTS

| | | | |
|---|---|---|---|
| 2,754,936 A | | 7/1956 | Butler |
| 2,937,722 A | * | 5/1960 | Ruet .......................... 188/72.5 |
| RE24,870 E | | 9/1960 | Butler |

(Continued)

FOREIGN PATENT DOCUMENTS

| | | |
|---|---|---|
| CN | 87 1 06666 A | 7/1988 |
| CN | 1225427 A | 8/1999 |

(Continued)

OTHER PUBLICATIONS

EPO machine translation, DE 4418702, Nov. 1995.*

(Continued)

*Primary Examiner* — Thomas J Williams
(74) *Attorney, Agent, or Firm* — Crowell & Moring LLP

(57) ABSTRACT

A disc brake, in particular for a commercial vehicle, including a brake caliper, which reaches over a brake disc and in which brake pads are positioned that can be pressed against the brake disc on both sides by at least one brake application device and that each have a lining carrier plate and a friction lining fastened thereto. The brake application device has at least one brake piston that acts on the lining carrier plate at the end face of the brake piston. The disc brake is designed such that at least one of the brake pads is supported in an articulated, pivotable, manner in the radial direction of the brake disc.

7 Claims, 5 Drawing Sheets

(51) Int. Cl.
  *F16D 55/22*   (2006.01)
  *F16D 125/58*  (2012.01)

(56) References Cited

U.S. PATENT DOCUMENTS

| | | | |
|---|---|---|---|
| 3,876,042 | A | 4/1975 | Borjesson |
| 4,793,447 | A | 12/1988 | Taig et al. |
| 2001/0045331 | A1 | 11/2001 | Hikari |

FOREIGN PATENT DOCUMENTS

| | | | | |
|---|---|---|---|---|
| DE | 1 855 586 | U | | 7/1962 |
| DE | 1 153 949 | B | | 9/1963 |
| DE | 1917555 | A1 | * | 10/1969 |
| DE | 2 149 742 | A | | 4/1972 |
| DE | 2218688 | A1 | * | 10/1973 |
| DE | 44 18 702 | A1 | | 11/1995 |
| DE | 10 2007 023 191 | A1 | | 12/2008 |
| EP | 0 856 680 | A1 | | 8/1998 |
| GB | 735748 | A | * | 8/1955 |
| GB | 1155820 | A | * | 6/1969 |
| JP | 55-132423 | A | | 10/1980 |
| JP | 1-266328 | A | | 10/1989 |
| JP | 7-305734 | A | | 11/1995 |
| JP | 8-232991 | A | | 9/1996 |
| WO | WO 2011/042280 | A1 | | 4/2011 |

OTHER PUBLICATIONS

International Search Report dated Dec. 21, 2012 with English Translation (Six (6) pages).
International Preliminary Report on Patentability (PCT/IB/326) and (PCT/IB/373) dated Apr. 10, 2014, including Written Opinion (PCT/ISA/237) (seven (7) pages).
German Office Action dated Jun. 21, 2012 with English translation (twelve (12) pages).
Chinese Office Action issued in Chinese Patent Application No. 201280047933.5 dated Jul. 30, 2015 with English translation (20 pages).

* cited by examiner

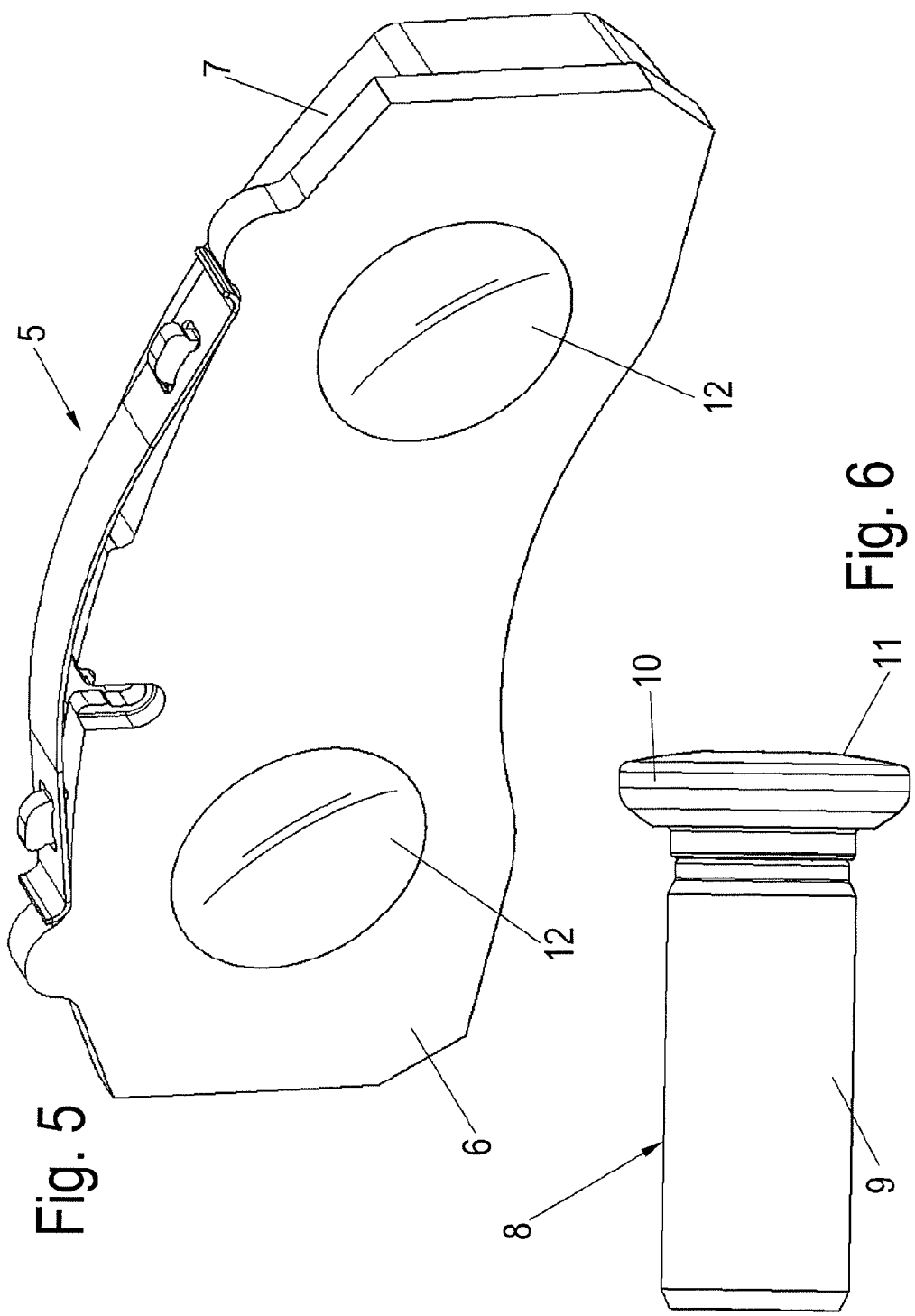

DISC BRAKE, IN PARTICULAR FOR A COMMERCIAL VEHICLE, AND BRAKE PAD FOR A DISC BRAKE

CROSS REFERENCE TO RELATED APPLICATIONS

This application is a continuation of PCT International Application No. PCT/EP2012/069094, filed Sep. 27, 2012, which claims priority under 35 U.S.C. §119 from German Patent Application No. 10 2011 115 214.1, filed Sep. 28, 2011, the entire disclosures of which are herein expressly incorporated by reference.

BACKGROUND AND SUMMARY OF THE INVENTION

The invention relates to a disc brake, in particular for a commercial vehicle, and to a brake pad for a disc brake.

To brake a vehicle, brake pads are pressed with their friction linings against a brake disc on both sides by means of a pneumatically or electromotively driven brake application device, frictional heat arising due to conversion of the kinetic energy and resulting in considerable heating of the brake disc.

This introduction of heat causes radial expansion of the brake disc which is usually of a ring shaped design.

In conventional brake discs with a tubular or conical neck portion, however, this expansion is obstructed, and because of this the brake disc is deformed reversibly in a way also likened to an "umbrella".

High thermal load, in conjunction with a suppressed radial expansion of the brake disc, may lead to high mechanical compressive stresses with the overshooting of the material yield strength. Upon cooling and when the stresses are reduced, overshooting of the tensile strength of the material may then occur, thus giving rise to surface cracks which are propagated ever further.

On the other hand, the "umbrella" action results in an uneven contact pattern of the brake pads, along with a concentration in the introduction of heat and local overheating of the brake disc.

In order to prevent this, solutions have already been proposed in which a structural separation of the friction ring of the brake disc from the brake disc neck allows uniform expansion, as a result of which not such high stresses occur in the material and the brake disc remains flat. However, these solutions can be implemented only with considerable outlay in manufacturing terms.

Optimization of the introduction of heat, particularly in order to prevent local overheating of the brake disc, is achieved by way of an elastic isobar brake pad, as it is known, which, however, necessitates a highly complicated and space consuming brake pad concept and, moreover, is also suitable only for low brake application forces, such as occur in the case of railroad brakes.

The object on which the invention is based is to develop further a disc brake and a brake pad of the generic type, such that the functional reliability of the disc brake is improved and the service life both of the brake disc and of the brake pads is prolonged.

This and other objects are achieved by a disc brake, in particular for a commercial vehicle, with a brake caliper that engages over a brake disc and in which brake pads capable of being pressed against the brake disc via at least one brake application device and having, in each case, a lining carrier plate and a friction lining fastened thereon, are positioned on both sides of the brake disc. The brake application device has at least one brake piston engaging on the lining carrier plate on the end face. At least one of the brake pads is mounted in an articulated manner, preferably tiltably, in a radial direction of the brake disc. The objects are achieved as well by a corresponding pad having a lining carrier plate with a friction lining fastened thereon, wherein the lining carrier plate has at least one recess with a curved base.

The invention makes it possible to have a thermally induced radial expansion of the brake disc, so that the effects described above when this expansion is obstructed cannot occur. The mounting of the brake pads corresponds in its action to the part lining brake discs mentioned, but, in contrast to these, in terms of its load bearing capacity, that is to say the ability to transmit brake application forces, is unchanged, as compared with the brake pads conventionally used in commercial vehicles.

In addition to more uniform heat and pressure distribution during the umbrella action of the brake disc, with an optimal design oblique radial wear of the brake disc and brake pads, such as has occurred hitherto, can also be reduced.

It should be emphasized especially that the invention can be implemented at a low outlay in structural and manufacturing terms, that is to say, is basically cost neutral.

Against this, there are the substantially longer service life of the brake disc and a gain in terms of functional reliability. This is due, above all, to the fact that the formation of cracks in the brake disc or brake disc ring is avoided and there is no need for a premature exchange of the brake disc.

In this context, mention may also be made of the increased operating reliability of the disc brake overall, which arises, in particular, from the fact that the hitherto existing risk of destruction of the brake disc, sometimes even of the entire disc brake, occurring as a result of the formation of cracks during the operation of the disc brake is prevented.

Whereas, in a fixed caliper disc brake, both brake pads are pressed onto the brake disc by two brake application devices equipped in each case with at least one brake piston, a sliding caliper disc brake functions according to the reaction principle. In this case, first, an application side brake pad is pressed by the brake application device onto the brake disc which then forms an abutment for the sliding caliper which, at the same time driving the opposite reaction side brake pad, is pushed opposite to the first application direction, until the reaction side brake pad comes to bear frictionally on the brake disc.

In this case, according to the invention, the reaction side lining carrier plate is mounted in an articulated manner, preferably tiltably, on the rear wall of the brake caliper, for which purpose the wall of the brake caliper and the lining carrier plate facing said wall are configured correspondingly.

For this purpose, according to an advantageous development of the invention, an elevation curved convexly in cross section is integrally formed onto the lining carrier plate or the wall of the brake caliper and matches with a recess, adapted to the contour of the projection, of the opposite part supported thereon. In this case, the elevation extends virtually in the form of a strip in the longitudinal direction of the brake pad transversely to the axis of the brake disc.

Instead of a strip, the lining carrier plate or the wall of the brake caliper may be provided with a plurality of crowned protuberances which engage into spherical cap shaped recesses of the opposite side which are adapted thereto.

Such a design is appropriate in the press on region of the brake piston on the application side lining carrier plate, the brake piston being composed of an adjusting spindle held rotatably in a bridge and of a thrust piece, which is held fixedly in terms of rotation on the lining carrier plate and is connected rotatably to the adjusting spindle and of which the free end face bearing against the lining carrier plate either is shaped as a crowned protuberance or has the spherical cap shaped receptacle.

It is also contemplated, however, to tie the thrust piece to the adjusting spindle in an articulated manner in such a way that a tilting movement in the radial direction of the brake disc is possible. In this case, the contact surfaces of the thrust piece and of the lining carrier plate may be planar or have another contour.

The elevation or recess may also be provided, instead of directly on or in the lining carrier plate, in a separate thrust plate bearing against the latter.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 4 and 5 show exemplary embodiments of a brake pad according to the invention;
and
FIG. 6 shows a detail of the disc brake in a side view.

DETAILED DESCRIPTION OF THE DRAWINGS

Figure 1:
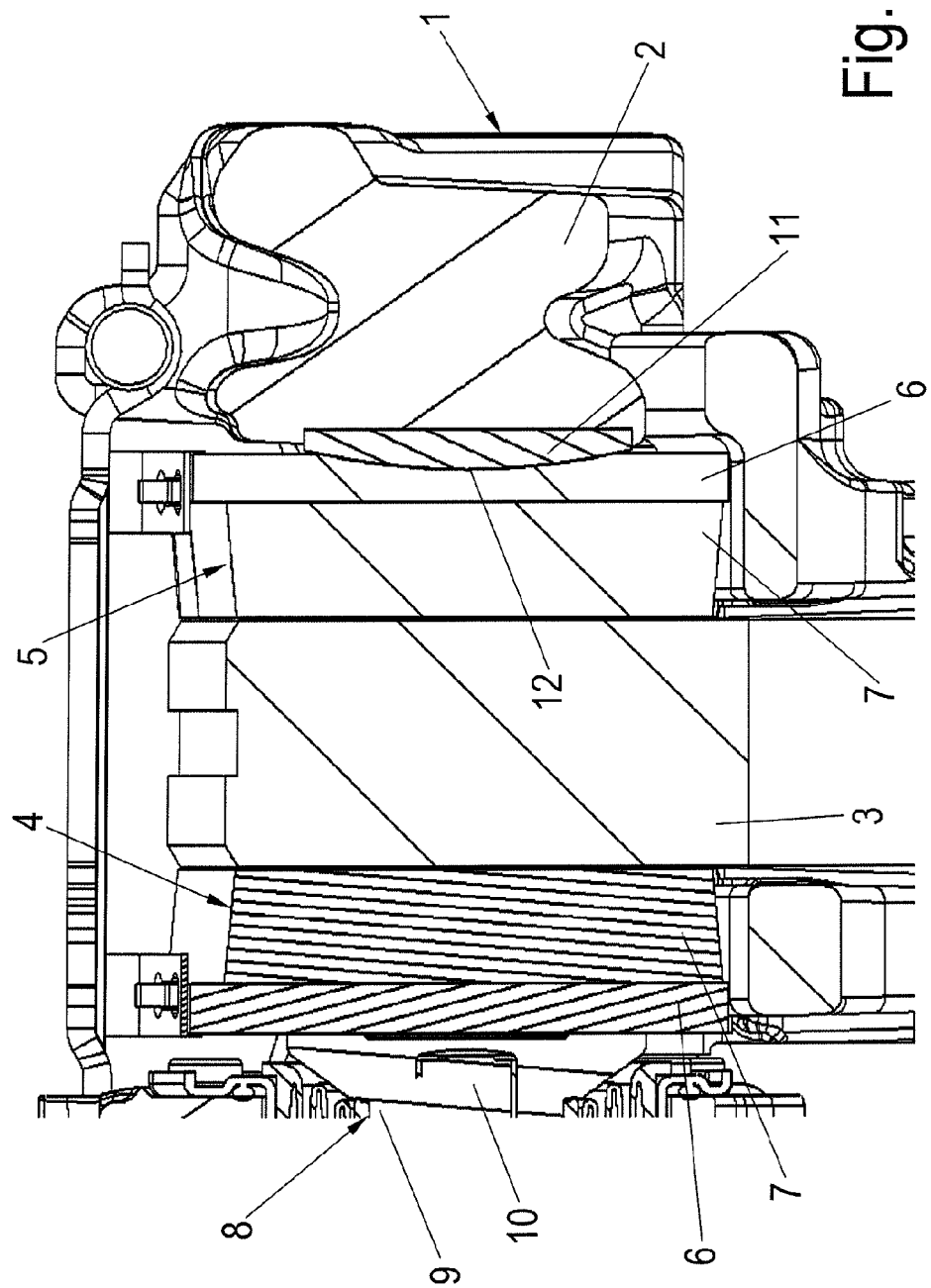
FIGS. 1-3 show various exemplary embodiments of a disc brake according to the invention, in each case in a partial sectional view.
Figure 2:
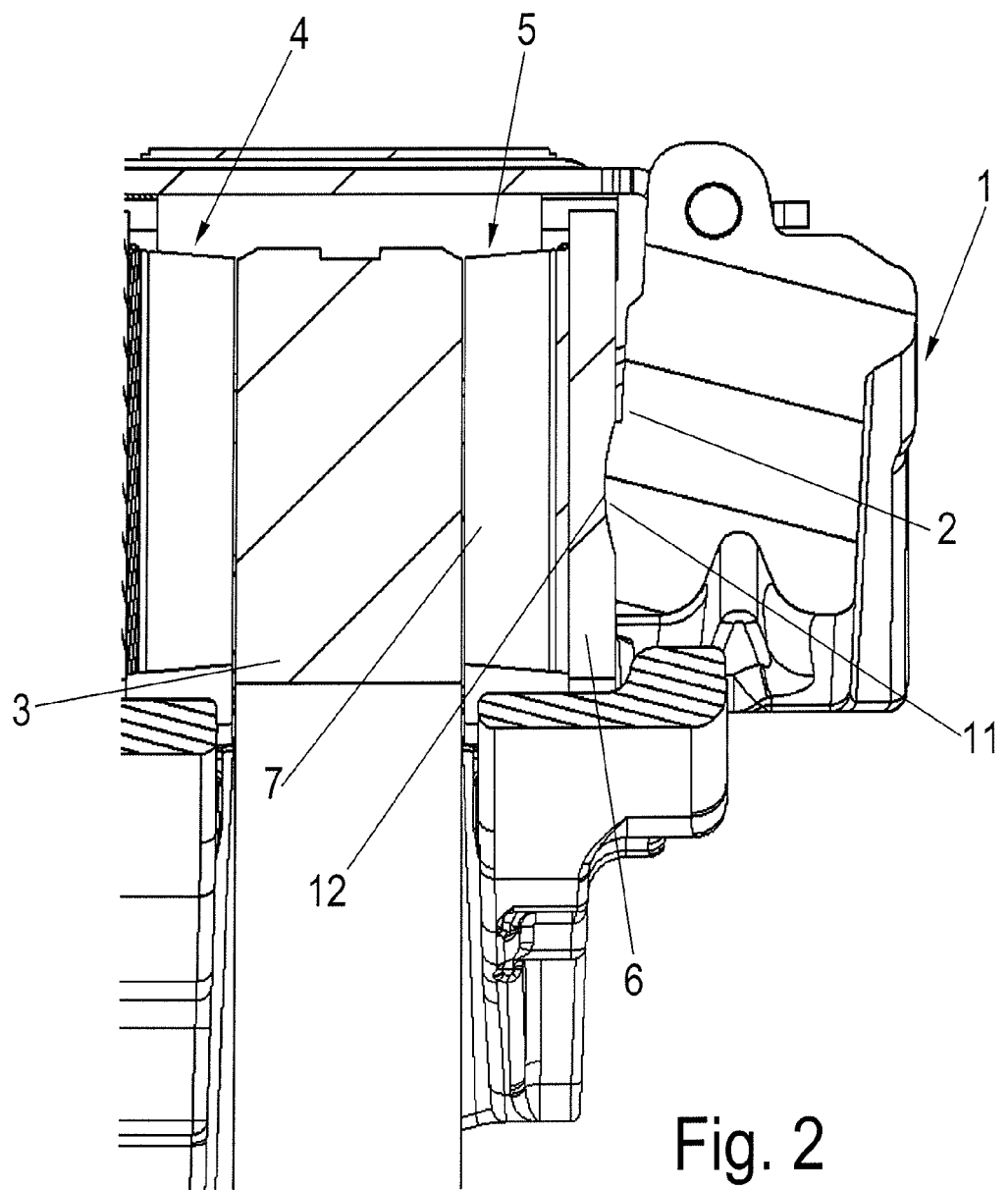
Figure 3:
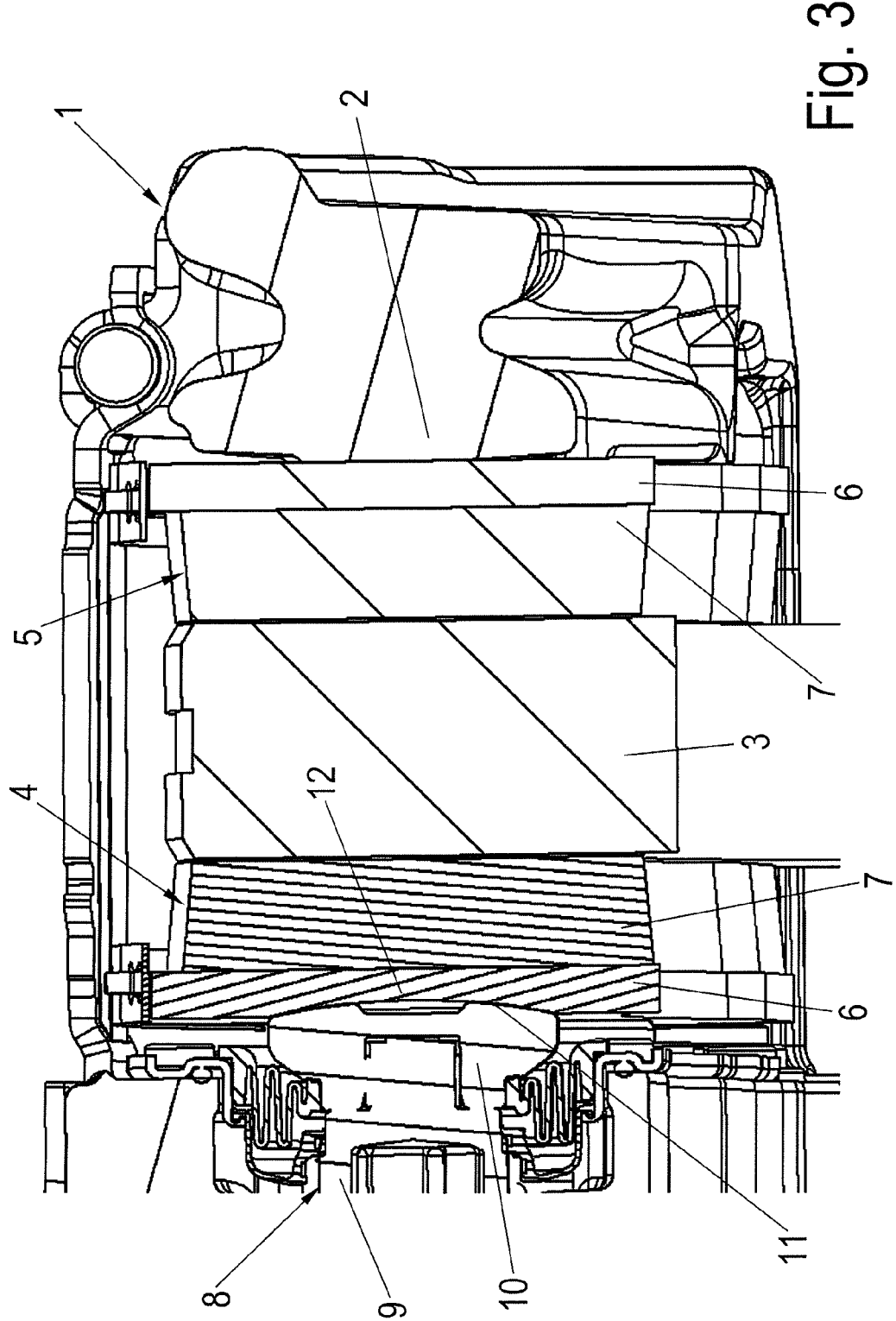

FIGS. 1-3 illustrate, in each case, a portion of a disc brake, in particular for a commercial vehicle, with a brake caliper 1 engaging over a brake disc 3 and designed as a sliding caliper disc brake with two brake pad 4, 5. The brake pads 4,5 can be pressed against the brake disc 3 on both sides and have, in each case, a lining carrier plate 6 and a friction lining 7 fastened thereon.

A brake piston 8 engages the brake pad 4 arranged on the application side and has an adjusting spindle 9 and a thrust piece 10. The thrust piece 10 is held rotatably on the adjusting spindle 9 and bears against the lining carrier plate 6 of the brake pad 4. The brake piston 8 is an integral part of a brake application device, by which the brake piston 8 can be pressed against the brake pad 4 and, consequently, against the brake disc 3 in the event of braking.

In the exemplary embodiment shown in FIG. 1, the reaction side brake lining 5 is mounted pivotably or tiltably in the radial direction of the brake disc 3.

For this purpose, the lining carrier plate 6 has spherical cap shaped recesses 12, as can be seen in FIG. 5 as an exemplary embodiment of the brake pad 5, two recesses 12 being provided here which are arranged at a distance from one another and in which elevations 11, shaped as a crowned protuberance, of a rear wall of the brake caliper 1 are seated.

In this case, the elevations 11 are formed by inserts which are introduced into the wall 2 which are connected thereto positively, frictionally or in a materially integral manner.

Figure 4:
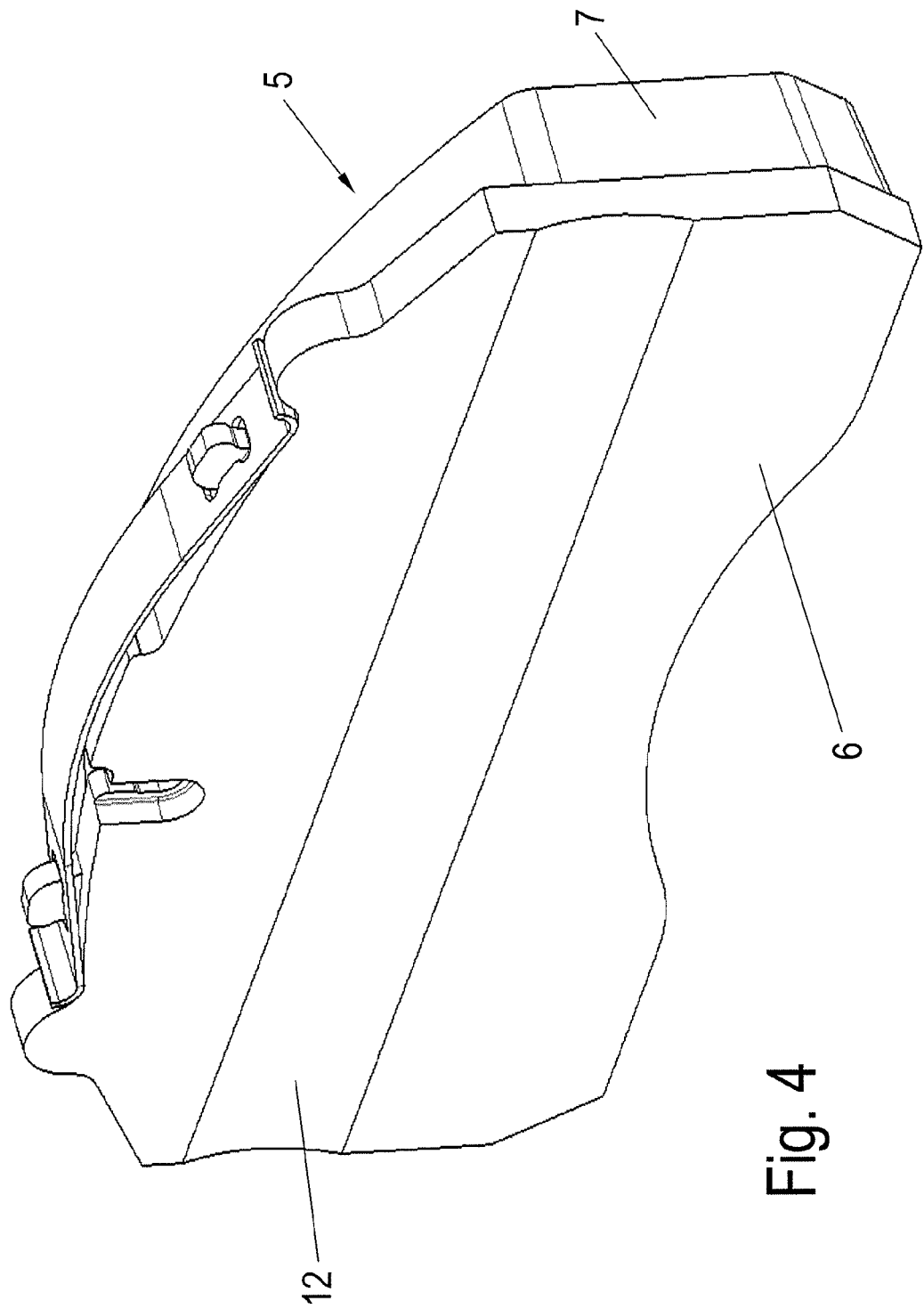

In the variant shown in FIG. 2, to which that shown in FIG. 4 as a brake pad corresponds, the elevation 11 is designed as a strip which is shaped convexly in cross section and which engages into a recess 12 adapted thereto, extending over the entire length of the lining carrier plate 6 and formed as a channel.

Whereas the elevation 11 may be integrally formed, during casting, into the brake caliper 1 composed of cast iron, the recess 12 in the brake lining according to FIGS. 4 and 5 can be introduced by cutting or by stamping if the lining carrier plate 6 is composed of sheet metal. With a version as a casting, the recesses 12 are likewise to be introduced during casting. It can be seen in FIG. 3 that the lining carrier plate 6 of the application side brake pad 4 is provided, correspondingly to FIG. 5, with spherical cap shaped recesses 12 in which the end faces of crowned shape 11 of the thrust pieces 10 are seated, so that, here too, the brake pad 4 is mounted pivotably or tiltably.

An adjusting spindle 9 having the crowned thrust piece 10 is illustrated in FIG. 6.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake having a brake disc, the disc brake comprising:
   a caliper adapted to engage over the brake disc;
   brake pads arranged in the caliper, each brake pad comprising a lining carrier plate and a friction lining fastened thereon;
   a brake application device configured to cause the brake pads to be pressed against the brake disc, the brake application device comprising a brake piston configured to engage at an end face on the lining carrier plate of one of the brake pads; and wherein
   at least one of the brake pads is mounted in an articulated manner relative to a radial direction of the brake disc,
   the lining carrier plate and a thrust piece of the brake piston or a rear wall of the caliper comprise tilting elements configured to correspond to one another to provide the articulated mount,
   the tilting elements comprise an elevation and a recess adapted to one another,
   the elevation is formed with a convex cross-section,
   the elevation has a strip shape and is arranged in the lining carrier plate, the thrust piece of the brake piston, or the rear wall of the brake caliper, the strip shape corresponding to only a portion of a rear surface of the lining carrier plate such that a height of the strip shape is substantially less than an overall height of the lining carrier plate, and
   the disc brake is a commercial vehicle disc brake.

2. The disc brake according to claim 1, wherein the elevation comprises an insert for the rear wall or the thrust piece of the brake piston.

3. The disc brake according to claim 1, wherein the elevation is integrally formed on the thrust piece of the brake piston.

4. The disc brake according to claim 1, wherein the recess extends over an entire length or a sub-region of the lining carrier plate or the thrust piece of the brake piston.

5. The disc brake according to claim 1, wherein the thrust piece is fastened to an adjusting spindle of the brake piston.

6. A commercial vehicle disc brake, comprising:
   a brake caliper that, in use, engages over a brake disc;
   first and second brake pads arranged in the caliper so as to be selectively pressed against respective sides of the brake disc via a brake application device, wherein
   each brake pad comprises a lining carrier plate and a friction lining material fastened thereon, the friction lining material of each brake pad being arranged adjacent to a respective friction surface of the brake disc, at least one of the first and second brake pads being pivotably mounted so as to adapt to the surface of the brake disc when the brake disc undergoes umbrella action, wherein the pivotal mounting of the at least one of the first and second brake pads comprises an elevation and corresponding recess, wherein the elevation is formed in either the lining carrier plate of the brake pad, a thrust piece of the brake application device, or a rear wall of the caliper, and the recess is formed in a mating one of the lining carrier plate, thrust piece, or rear wall, and the elevation has a strip shape and is arranged in the lining carrier plate, the thrust piece of the brake piston, or the rear wall of the brake caliper, the strip shape corresponding to only a portion of a rear surface of the lining carrier plate such that a height of the strip shape is substantially less than an overall height of the lining carrier plate.

7. A brake pad for a disc brake, comprising:

a friction lining material;

a lining carrier plate to which the friction lining material is fastened on one side thereof; and wherein the lining carrier plate comprises at least one recess having a curved base on a side of the lining carrier plate opposite that of the friction lining material, and the at least one recess comprises a channel extending over a longitudinal length of the lining carrier plate, the channel having a height substantially less than an overall height of the lining carrier plate, and being adjoined on each longitudinal side by flat surfaces of a rear surface of the lining carrier plate, which flat surfaces lie in a common plane.

* * * * *